(12) United States Patent
Schreiber et al.

(10) Patent No.: US 10,125,780 B2
(45) Date of Patent: Nov. 13, 2018

(54) BATTERY MONITORING SYSTEM

(71) Applicant: JOHNSON CONTROLS TECHNOLOGY COMPANY, Holland, MI (US)

(72) Inventors: Jeb W. Schreiber, Stewartstown, PA (US); Ajit W. Kane, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 435 days.

(21) Appl. No.: 14/827,399

(22) Filed: Aug. 17, 2015

(65) Prior Publication Data
US 2016/0053765 A1    Feb. 25, 2016

Related U.S. Application Data

(60) Provisional application No. 62/039,985, filed on Aug. 21, 2014.

(51) Int. Cl.
*F04B 17/00* (2006.01)
*F04D 27/00* (2006.01)
(Continued)

(52) U.S. Cl.
CPC ....... *F04D 27/008* (2013.01); *F04D 25/0673* (2013.01); *F04D 27/0292* (2013.01);
(Continued)

(58) Field of Classification Search
CPC .. H02J 7/0047; H02J 7/09; H02J 11/20; H02J 9/06; F04D 29/058; F04D 29/048; F04D 27/008; F04D 27/0292; F04D 25/0673
(Continued)

(56) References Cited

U.S. PATENT DOCUMENTS 5,130,659 A    7/1992    Sloan
5,574,345 A    11/1996    Yoneta et al.
(Continued)

FOREIGN PATENT DOCUMENTS

CN    1319264 C    5/2007
EP    0430009 A1    6/1991
(Continued)

OTHER PUBLICATIONS

Machine translation of JP 3-117339, Dec. 4, 1991.*
(Continued)

*Primary Examiner* — Charles Freay
(74) *Attorney, Agent, or Firm* — Fletcher Yoder, PC (57) ABSTRACT

A method of monitoring a backup battery for a magnetic bearing centrifugal compressor. The method includes: establishing threshold voltage values applicable to the battery backup battery level; monitoring the actual voltage of the battery backup; comparing the actual voltage of the battery backup to the threshold voltage; initiating a soft shutdown of the magnetic bearing centrifugal compressor if the magnetic bearing centrifugal compressor is operating and the actual voltage is below the threshold voltage for a defined period of time; preventing the magnetic bearing centrifugal compressor from starting if the magnetic bearing centrifugal compressor is not operating and the actual voltage is below the threshold voltage; or allowing the magnetic bearing centrifugal compressor to continue operation or begin operation if the actual voltage is greater than the threshold voltage.

19 Claims, 9 Drawing Sheets

(51) Int. Cl.
  *F04D 29/048* (2006.01)
  *F04D 29/058* (2006.01)
  *H02J 9/06* (2006.01)
  *F04D 25/06* (2006.01)
  *F04D 27/02* (2006.01)

(52) U.S. Cl.
  CPC ......... *F04D 29/048* (2013.01); *F04D 29/058* (2013.01); *H02J 9/06* (2013.01)

(58) Field of Classification Search
  USPC .......................................... 417/411; 320/132
  See application file for complete search history.

(56) References Cited

U.S. PATENT DOCUMENTS

| | | | |
|---|---|---|---|
| 5,757,148 A | 5/1998 | Shinozaki et al. | |
| 5,764,034 A * | 6/1998 | Bowman | A61M 5/14 320/155 |
| 6,037,749 A * | 3/2000 | Parsonage | B60L 11/1859 320/132 |
| 6,252,377 B1 * | 6/2001 | Shibutani | G01R 31/3624 320/132 |
| 6,313,609 B1 * | 11/2001 | Brink | G01R 31/3631 320/132 |
| 6,463,748 B1 | 10/2002 | Benedict et al. | |
| 7,053,511 B2 | 5/2006 | Taniguchi et al. | |
| 7,061,246 B2 * | 6/2006 | Dougherty | G01R 31/36 324/426 |
| 7,345,859 B2 * | 3/2008 | Andersen | H02J 7/0029 361/23 |
| 7,474,228 B2 | 1/2009 | Lockhart et al. | |
| 7,928,620 B2 | 4/2011 | Denk et al. | |
| 8,602,746 B2 * | 12/2013 | Gallwey | F04B 49/20 388/811 |
| 2009/0074406 A1 * | 3/2009 | Wurst | H04L 41/06 398/25 |
| 2010/0231170 A1 | 9/2010 | Davis et al. | |
| 2013/0285441 A1 * | 10/2013 | Sanders | H04W 52/02 307/9.1 |

FOREIGN PATENT DOCUMENTS

| | | |
|---|---|---|
| JP | H03-117339 U | 12/1991 |
| JP | H06-147191 A | 5/1994 |
| JP | H11-055872 A | 2/1999 |
| JP | 2014-054141 A | 3/2014 |
| KR | 1020020053342 A | 7/2002 |
| TW | M413621 U | 10/2011 |
| TW | M416582 U | 11/2011 |

OTHER PUBLICATIONS

Taiwanese Office Action for TW Application No. 104127147 dated Jun. 27, 2016, 6 pages.
Korean Office Action for KR Application No. 10-2017-7006207 dated Jan. 2, 2018, 17 pgs.
Japanese Office Action for JP Application No. 2017-509644 dated Mar. 27, 2018, 12 pgs.
Chinese Office Action for CN Application No. 201580048689.8 dated Aug. 28, 2018, 7 pgs.

* cited by examiner

BATTERY MONITORING SYSTEM

FIELD OF THE INVENTION

The present invention is directed to a system for monitoring a backup battery that supplies power to the magnetic bearing in the event of the failure of an electrical supply voltage. In particular, the invention is directed to a system of monitoring a backup battery and monitoring system for use with a centrifugal chiller that possesses a magnetic bearing centrifugal compressor.

BACKGROUND OF THE INVENTION

In general terms, a centrifugal compressor for a chiller typically consists of the following components: inlet guide vanes, one or more impellers within a housing surrounded by one or more diffusers with collectors driven by some mechanical shaft means, such as for example, an electric motor. The mechanical shaft means is supported by one or more bearings of the rolling element, journal, or magnetic bearing type which accommodate both radial and axial loads. In variable speed electric chillers, the centrifugal compressor is supplied with electrical power through an adjustable speed motor drive which alters the frequency and/or voltage of the power to the motor to modulate the speed of the compressor.

Rolling element bearings are generally passive devices and, during normal operation, operate without the requirement of active control. The chiller control system does not typically provide active control of the rolling element bearings where, in this context, active implies continual adjustment of some bearing feature. Chiller control systems for centrifugal chillers which use rolling element bearings in the compressor may monitor the bearing temperature, at periodic intervals, as an indication of whether the machine is operating properly. An elevated temperature is used as an indication of a potential mechanical problem with the bearings. If the measured bearing temperature exceeds a predefined set point, the chiller control system may be programmed to stop the machine and alert the user.

In magnetic bearing centrifugal compressors, the compressor rotor is suspended within a magnetic field generated by the magnetic bearings. For definitional purposes, "magnetic bearings" are electromagnetic devices used for suspending a rotating body in a magnetic field without mechanical contact. The bearings can be further classified as active, indicating that some type of active control system is necessary to ensure stable levitation of the rotating body.

Distinct from other compressor types, a magnetic bearing centrifugal compressor uses magnetic bearings as the primary means for supporting the rotor structure. There is a clearance gap between the rotating and stationary components of the bearing that is measurable and controllable. For the magnetic bearings to operate properly, electrical power and proper operation of the magnetic bearing control electronics are required.

In contrast to conventional rolling element bearings, magnetic bearings need to be continuously supplied with electrical energy. If the supply voltage of the magnetic bearings fails, for example as a result of an electrical failure of the power supply system, not only will the motor run down, but the functionality of the magnetic bearings will no longer be provided. In order to avoid damage to the magnetic bearings, the shaft, and/or other components in the event of failure of the supply voltage when the motor is still rotating, so-called emergency operation conditions may be implemented mechanically. However, such emergency operations are only effective for a limited number of failures of the supply voltage of the magnetic bearings without the magnetic bearings, the shaft or other components being damaged. Therefore, applications of magnetic bearings in sites with insufficiently stable electrical power supply systems may be problematic. In such circumstances, the maximum permissible number of emergency operations of the magnetic bearings is quickly reached, with the result that the abovementioned components need to be replaced even after a relatively short period of time. This replacement is generally time-consuming and associated with high costs.

Therefore, backup systems, such as batteries, are often used for safeguarding the magnetic bearings in the event of failure of the electrical supply voltage. Such backup systems maintain the functionality of the magnetic bearing arrangement until the rotating shaft is braked to a sufficient extent such that no damage or wear occurs to the bearings or shaft.

Because the battery/batteries provide the necessary backup power during an electrical utility power outage, it is important that the battery/batteries be operative when such power outage occurs. Therefore, the batteries must be periodically tested to insure that a proper charge is maintained during operation.

Therefore, it would be beneficial to provide an improved battery monitoring system which monitors the condition and state of the battery when the battery is under load and communicates such status to a control unit, thereby allowing a missing, disconnected, weak or dead battery to be detected and appropriate action taken.

SUMMARY OF THE INVENTION

It is an object of the present invention to provide a monitoring system for a backup battery system for magnetic bearing centrifugal compressors which can simply and reliably determine the battery charge level while the compressor has power and the batteries are charging.

It is an object of the present invention to provide a monitoring system which prevents operation of the compressor in the event of a problem with the backup battery system, thereby preventing damage to the compressor and prolonging magnetic bearing operating life.

It is an object of the present invention to provide a monitoring system which gradually powers down the operation of the compressor in the event that a problem occurs with the backup battery system while the compressor is operating, thereby preventing damage to the compressor and prolonging magnetic bearing operating life.

It is an object of the present invention to monitor the battery to allow for the operation of the chiller to be inhibited when there is not adequate available power in the battery to protect the system.

It is an object of the present invention to provide a monitoring system which tests the system at known loads and compares the results to determined limits, allowing faults and warnings to be displayed when a missing, disconnected, weak or dead battery is detected.

An embodiment is directed to a method of monitoring a backup battery for a magnetic bearing centrifugal compressor. The method includes: establishing threshold voltage values applicable to the battery level; monitoring the actual voltage of the backup battery; comparing the actual voltage of the backup battery to the threshold voltage; initiating a soft shutdown of the magnetic bearing centrifugal compressor if the magnetic bearing centrifugal compressor is operating and the actual battery voltage is below the threshold voltage for a defined period of time; preventing the magnetic bearing centrifugal compressor from starting if the magnetic bearing centrifugal compressor is not operating and the actual battery voltage is below the threshold voltage; or allowing the magnetic bearing centrifugal compressor to continue operation or begin operation if the actual battery voltage is greater than the threshold voltage.

An embodiment is directed to a method of monitoring a backup battery for a magnetic bearing centrifugal compressor. The method comprising: monitoring voltage amplitude over a period of time at the input to a universal power source of the magnetic bearing centrifugal compressor to determine if the backup battery is connected or disconnected, whereby if the difference between the minimum and maximum voltage is greater than a defined variance, the sample is recorded and saved; displaying a fault if the defined variance is exceeded for a defined amount of consecutive samples indicating a disconnected backup battery; initiating a soft shutdown of the magnetic bearing centrifugal compressor if the magnetic bearing centrifugal compressor is operating and the defined variance is exceeded for a defined amount of consecutive samples indicating a disconnected backup battery; preventing the magnetic bearing centrifugal compressor from starting if the magnetic bearing centrifugal compressor is not operating and the defined variance is exceeded for a defined amount of consecutive samples indicating a disconnected backup battery; or allowing the magnetic bearing centrifugal compressor to continue operation or begin operation if the defined variance is not exceeded for a defined amount of consecutive samples indicating a disconnected backup battery.

An embodiment is directed to a method of monitoring a backup battery for a magnetic bearing centrifugal compressor. The method comprising: monitoring the number of times bearings drop a shaft of the magnetic bearing centrifugal compressor while the shaft is rotating during a power loss event; counting the number of times bearings drop a shaft of the magnetic bearing centrifugal compressor; comparing the counted number of times bearings drop a shaft of the magnetic bearing centrifugal compressor to a defined threshold number of times bearings drop a shaft of the magnetic bearing centrifugal compressor; displaying a fault if the counted number of times bearings drop a shaft of the magnetic bearing centrifugal compressor is greater than the defined threshold; and preventing the magnetic bearing centrifugal compressor from starting until such fault is cleared.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Figure 1:
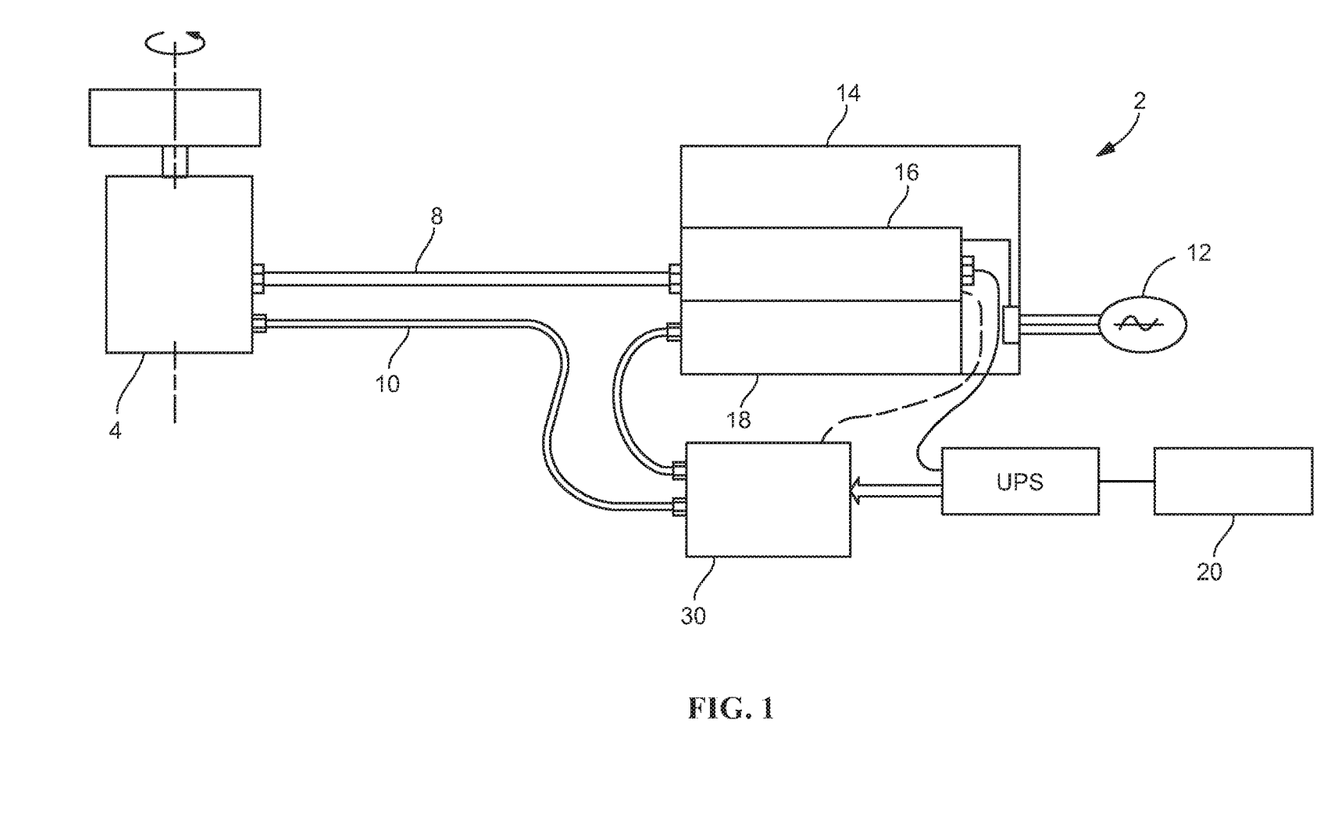
FIG. 1 is a diagrammatic view of an illustrative apparatus for supplying electric power to a motor.

FIG. 1 illustrates a diagrammatic representation of an embodiment of an illustrative apparatus 2 for supplying electric power to a motor 4 which has magnetic bearings. As shown in FIG. 1, a magnetic bearing cable 8 and a motor cable 10 are connected the induction motor 4 whose rotor is rotatably levitated and supported by magnetic bearings. The magnetic bearing cable 8 and the motor cable 10 are connected through a control console or panel 14 to a three-phase, 200-V commercial AC power supply 12. The control panel 14 has a magnetic bearing controller 16, connected to the commercial AC power supply, which supplies a magnetic bearing control current through the magnetic bearing cable 8 to control the magnetic bearings 6 which levitate and support the rotor out of contact therewith at a target position. The control panel 14 also has a motor driver 18 which comprises a frequency/voltage converter such as a general-purpose inverter or the like that is connected to the commercial AC power supply. The motor driver 18 supplies electric power having a predetermined frequency/voltage through the motor cable 10 for operating the motor 4 at a predetermined speed. The magnetic bearing controller 16 is backed up by a battery power supply 20 such as, but not limited to, a 48-V, 2.2-Ahr battery. When the commercial AC power supply 12 fails, the battery power supply 20 supplies power to the magnetic bearing controller 16 to enable the magnetic bearing controller 16 to continuously operate the magnetic bearings 6.

If the commercial AC power supply is subjected to a failure while the motor 4 is in operation, the magnetic bearings may be continuously operated by the power supplied from the battery power supply 20 or a soft shutdown may be initiated. However, since the motor driver 18 is no longer supplied with the AC power from the commercial AC power supply, the rotor of the induction motor 4 rotates in a free-running condition. The rotor which is rotatably supported by the magnetic bearings usually rotates at a high speed of at least several thousand rpm. Because the rotor is magnetically kept out of contact with the magnetic bearings, the rotor does not suffer any decelerating friction force. Consequently, it takes a long period of time until the rotor comes to a stop. Alternatively, a braking system may be included to cause the rotor to stop more quickly.

In order for the magnetic bearings to be properly operated when a power supply failure occurs, the batteries must be properly charged to provide sufficient power to properly maintain the magnetic field as required. The invention is, therefore, directed to a system and method to monitor and communicate the state of the battery that is used as a backup for an uninterruptible power supply (UPS) system for the magnetic bearings and control panels, thereby preventing damage to the magnetic bearings when the AC power is lost.

Figure 2:
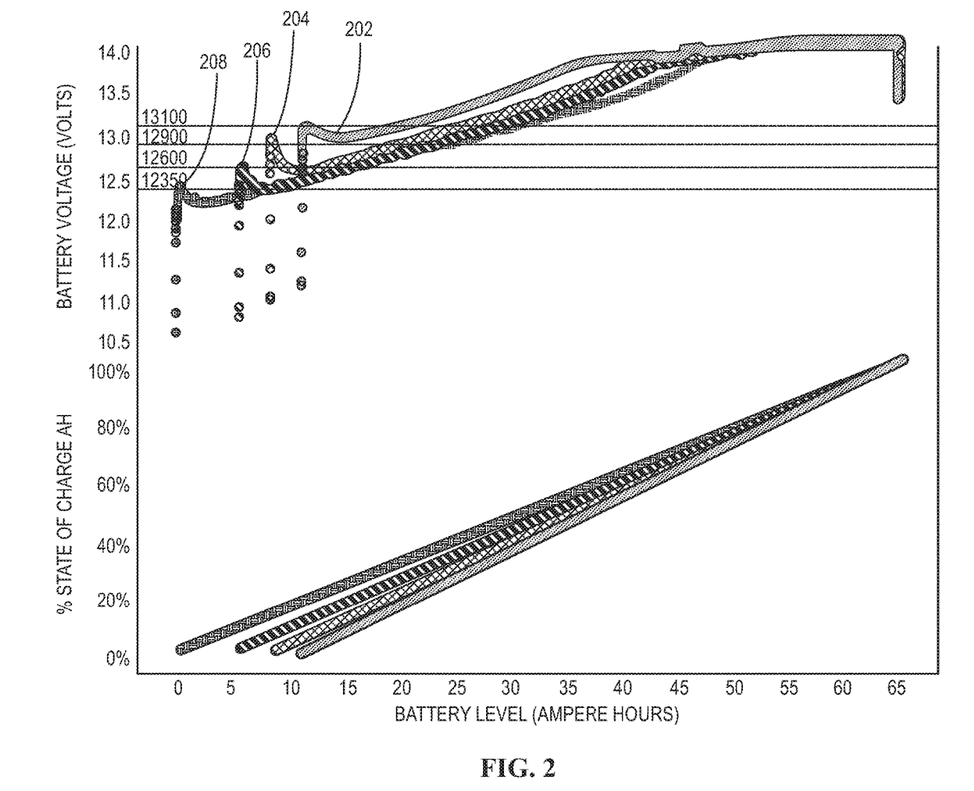
FIG. 2 is a graph showing the relationship between battery voltage and battery charge level at various temperatures.

In operation, if the apparatus is powered and the battery is charging, the battery voltage of the battery power supply 20 is monitored while the apparatus 2 has power and the battery is charging to determine the battery level. The battery level is communicated to a control panel 30 which controls the apparatus 2. An illustrative example of the relationship between battery voltage and battery level (Ah) at different temperatures is shown in FIG. 2. The information provided in FIG. 2 is meant to be illustrative, i.e. directed to particular equipment, it is not meant to limit the scope of the invention to the specific relationship shown. Line 202 represents a 4 degree temperature change, line 204 represents a 12 degree temperature change, line 206 represents a 24 degree temperature change, and line 208 represents a 50 degree temperature change. These values of temperature change represent increases above ambient temperature.

Figure 3:
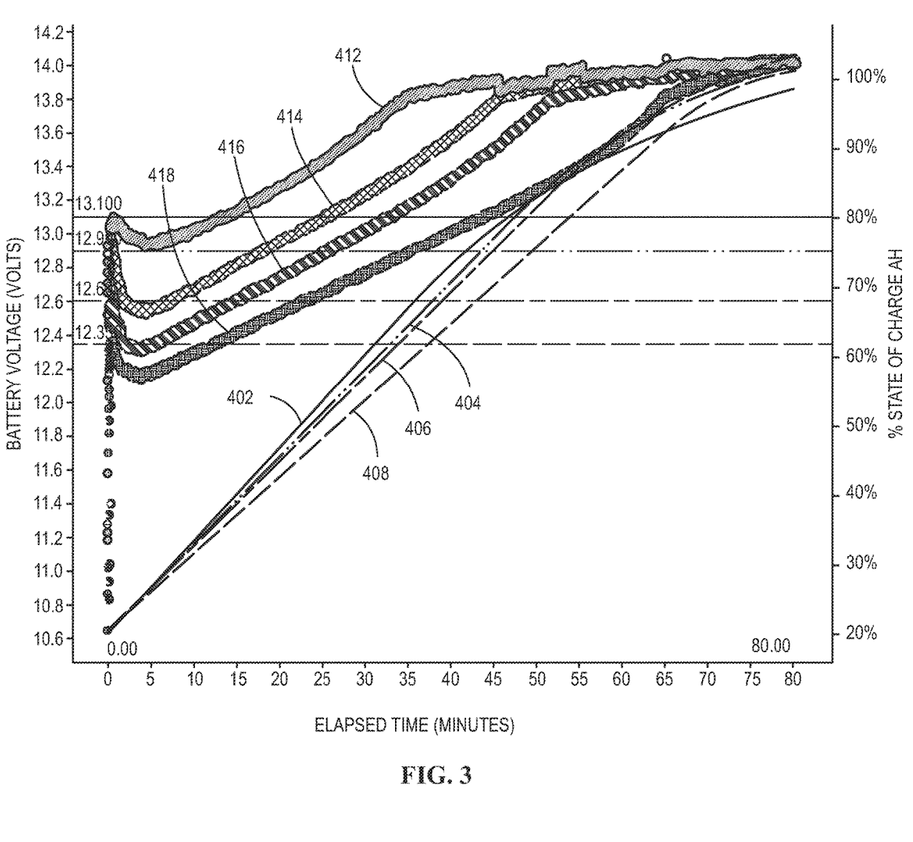
FIG. 3 is a graph showing the relationship between battery voltage threshold and elapsed time at various temperatures.
Figure 4:
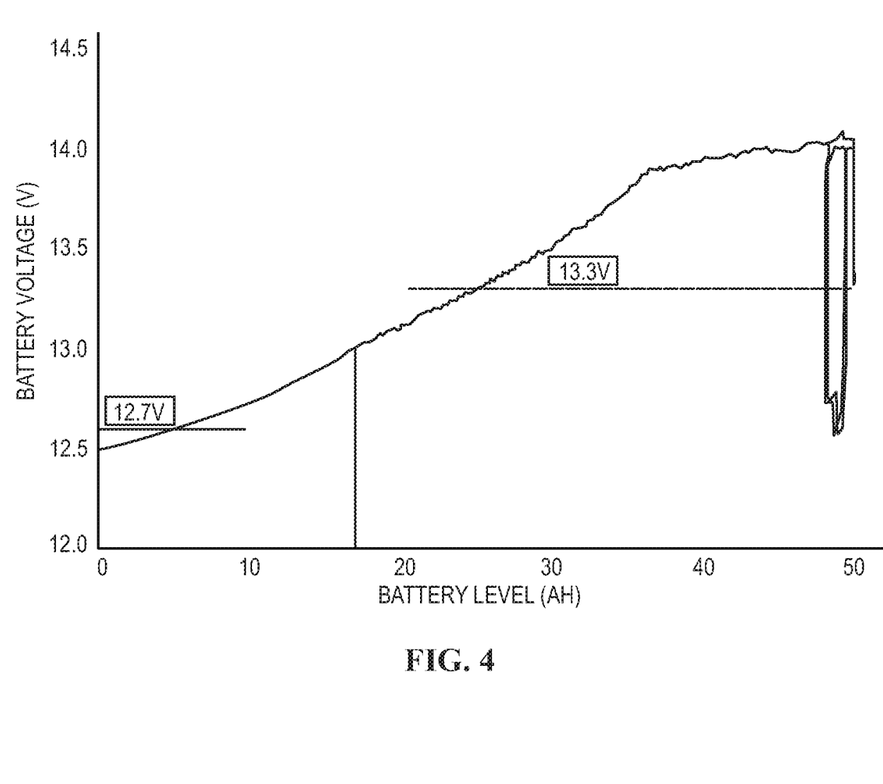
FIG. 4 is a graph showing the relationship between battery voltage and battery level.

For example, in the illustrative embodiment shown, when properly operating, after the battery is fully charged the voltage will display and hold a trickle charge voltage above the threshold, thereby preventing any warnings and/or faults from occurring. In the embodiment shown the trickle charge voltage is approximately 13.3v ±0.06v for more than a predetermined time, such as 5 minutes (as shown in FIG. 3). In contrast, if the battery voltage is below a defined threshold (12.7v for the illustrative embodiment) and remains below the defined threshold for a fixed period of time (12.7v for 5 minutes for the illustrative embodiment), warnings and/or faults will be sent indicating a faulty battery.

Regardless of the particular relative values detected by the monitoring system, if the battery voltage is below a defined threshold (e.g. 12.7 v for 5 seconds) and the apparatus 2 is not running, the system will inhibit or prevent the apparatus from starting until the battery voltage is above the threshold. In the illustrative embodiment shown, the apparatus 2 will be prevented from starting until the battery voltage exceeds the threshold by at least 0.1 volts. (12.8 v for the illustrative embodiment).

If the battery voltage is below a defined threshold and the apparatus 2 is running, a warning is displayed indicating low battery voltage. After the warning has been displayed for a specific period of time, a low battery voltage fault shall initiate a soft shutdown or shutdown sequence of the apparatus 2. In the illustrative embodiment, the specific period of time is sixty minutes as shown in the elapsed time of FIG. 3. In other words, if the battery is not properly charged within 60 minutes, a shutdown of the apparatus 2 will be initiated. For the illustrative embodiment shown, line 402 represents a 4 degree temperature change, line 404 represents a 12 degree temperature change, line 406 represents a 24 degree temperature change, and line 408 represents a 50 degree temperature change. These values of temperature change represent increases above ambient temperature.

Alternatively, if the battery voltage rises above the threshold during the specific period of time, the warning is removed and the fault is cleared. For the illustrative embodiment shown, line 412 represents a 4 degree temperature change, line 414 represents a 12 degree temperature change, line 416 represents a 24 degree temperature change, and line 418 represents a 50 degree temperature change.

The battery voltage threshold is influenced by the temperature of the battery. However, if no temperature sensor is provided proximate the battery, the control panel 30 temperature can be used. In such instances, it is assumed that when the apparatus is not running the temperature inside of the control panel and the battery will equalize to nearly the same temperature. Therefore, this threshold is used as a start-inhibit monitoring voltage while the unit is not running. However, while running, the battery will charge above the lowest threshold before the control panel temperature has time to drift enough due to internal heat sources to cause nuisance warnings.

Figure 5:
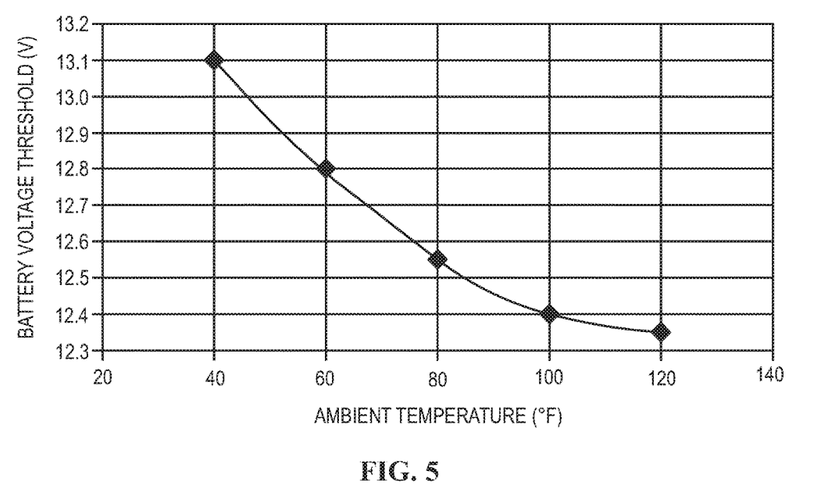
FIG. 5 is a graph showing the relationship between battery voltage threshold and ambient temperature.

Referring to FIG. 5, in the illustrative embodiment, the battery voltage threshold for the expected ambient temperature range is shown. A linear interpolation or curve fit is used to determine the threshold at intermediate temperatures between the points shown.

The battery voltage threshold may be adjustable within the measured voltage range of the battery with service level access to better meet the needs of sites that may experience nuisance issues.

The monitoring system must be able to detect a battery which is disconnected from the apparatus. Such disconnection may result from, but is not limited to, an open disconnect, blown fuse, disconnected wire, or other battery issues. The monitoring system measures the voltage at the input to the control panel. Therefore, in the event that the battery is disconnected from the apparatus, the voltage measured by the monitoring system will be only the charging voltage output by the UPS.

Figure 6:
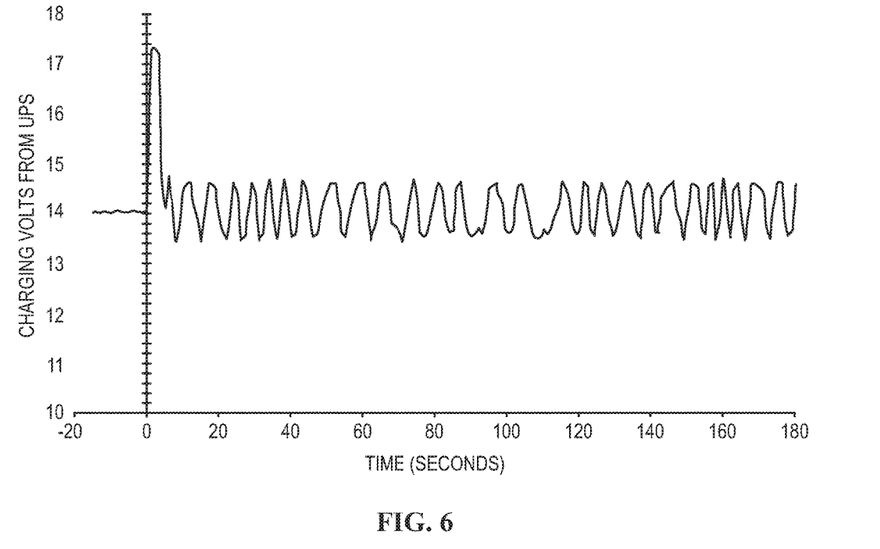
FIG. 6 is a graph showing the relationship between UPS output voltage with battery disconnected and elapsed time.

The charging voltage output from the UPS is noticeably different when the battery is disconnected in comparison to when a battery is connected and is charging. With a battery connected, the charging voltage is steady over time. When disconnected, the voltage bounces up and down several times a minute with a defined or noticeable amplitude. In the illustrative embodiment shown, the amplitude is approximately 1 volt, as shown FIG. 6. In order to properly determine whether the battery is connected or disconnected, the monitoring system monitors or samples the amplitude readings over a defined period of time. In the illustrative embodiment shown, the defined period of time is 10 seconds. During the defined time period, if the difference between the minimum and maximum voltage is greater than a defined variance, the sample is recorded and saved. In the embodiment shown, the defined variance is 0.5 volts. If the defined variance is exceeded for 4 consecutive samples, a fault is displayed indicating a disconnected battery.

If the fault occurs while the apparatus is not running, the system will inhibit or prevent the apparatus from starting up until the fault clears or is cleared. The fault can be cleared manually with service level access if the charging voltage is stable within the expected range for a defined period of time. In the illustrative embodiment shown, the defined period of time is 60 seconds.

If the fault occurs while the apparatus is running, a warning is displayed indicating a disconnected battery. After the warning has been displayed for specific designated period of time, a battery disconnect fault shall initiate a soft shutdown of the apparatus 2. In the illustrative embodiment, 10 minutes is the designated period of time. The fault can be cleared manually with service level access if the charging voltage is stable within the expected range for a defined period of time. In the illustrative embodiment shown, the defined period of time is 60 seconds.

In addition, whether the apparatus is running or not running, when the battery is disconnected, there is commonly a voltage peak above typical charging voltage range. If the battery voltage goes above a threshold level, i.e. 16 volts for the illustrative embodiment shown, a warning is displayed to check the battery connection. This warning is counted as the first sample toward the 4 consecutive samples that lead to the disconnected battery fault.

In the event of a power loss to the apparatus, the monitoring system monitors the battery voltage to determine the health of the battery. In the illustrative embodiment shown, the load on the battery has been determined to be 500-600 W while levitated and around 200 W while delevitated and powering only the control panels, as shown in FIG. 7, which illustrates the relationship between battery voltage and battery level (% Ah remaining).

Figure 7:
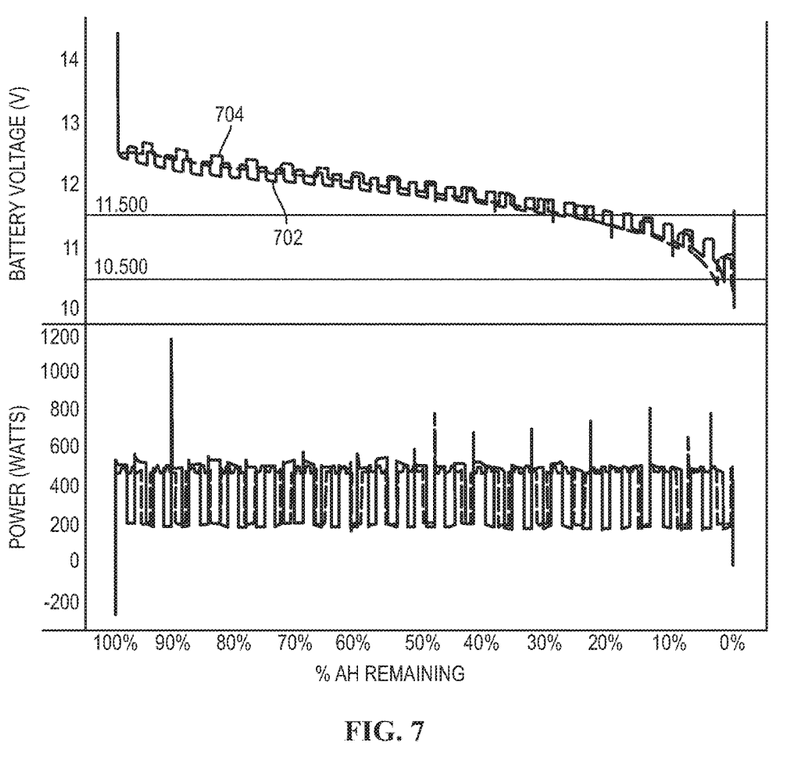
FIG. 7 is a graph showing the relationship between battery voltage and battery level remaining during a power loss event.

FIG. 7 illustrates cycling between the levitated and delevitated loads without allowing the battery to charge between cycles. This test was done first on an apparatus at room temperature and second on a bench test at a minimum specified ambient temperature, i.e. 4 degrees Celsius for the embodiment shown. The results show that the temperature does not have as much influence while the battery is under load as it does while the battery is charging. This supports the use of a low voltage limit that does not change with temperature. For the illustrative embodiment shown, line 702 represents the apparatus at room temperature and line 704 represents the apparatus at 4 degrees Celsius.

Figure 8:
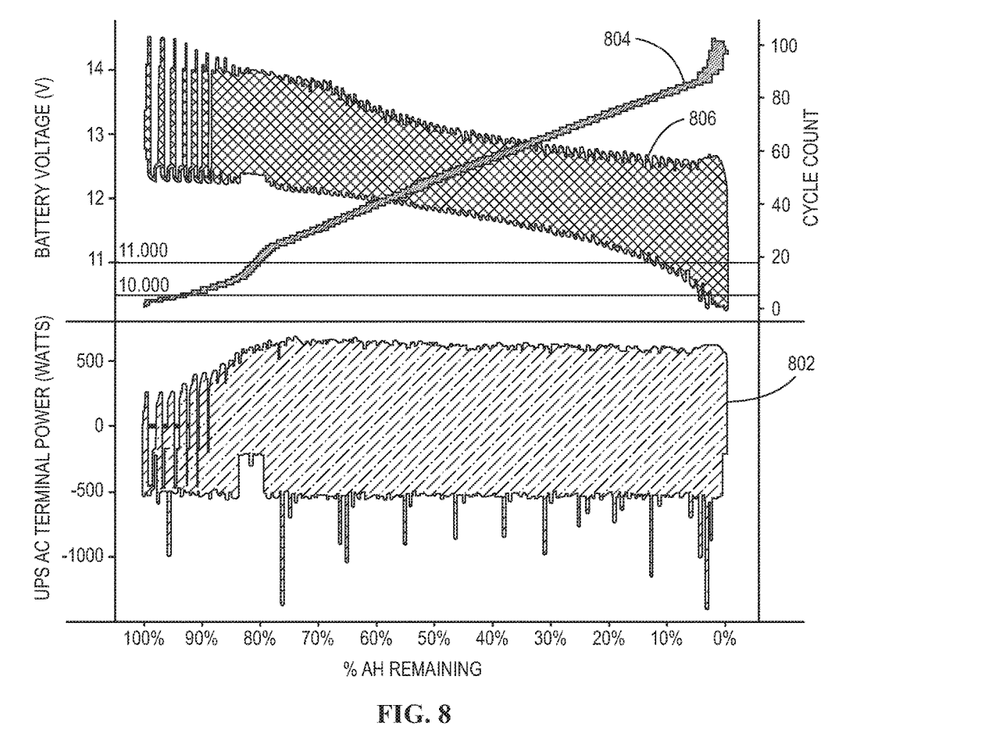
FIG. 8 is a graph showing the results of testing as the power was cycled from a levitated load to a delevitated load to a no load condition, allowing the battery to charge between load cycles.

As shown in FIG. 8, for the illustrative embodiment, nearly 100 load cycles are possible before the battery voltage drops below the low battery voltage limit (10.5v in the illustrative embodiment) and no longer supports the entire load for the embodiment shown. For the illustrative embodiment shown, line 802 represents power, line 804 represents cycle count and line 806 represents battery voltage. Although an increased battery load causes the battery voltage to drop, a single low voltage limit is used to simplify the control design. The worst case of the levitated and delevitated voltage limits will be used. In general, the low battery voltage limit is set where the battery still has enough charge to withstand a defined number of load cycles, such as, but not limited to, at least 4 load cycles. This ensures that the unit is protected even with variation between batteries and conditions.

Figure 9:
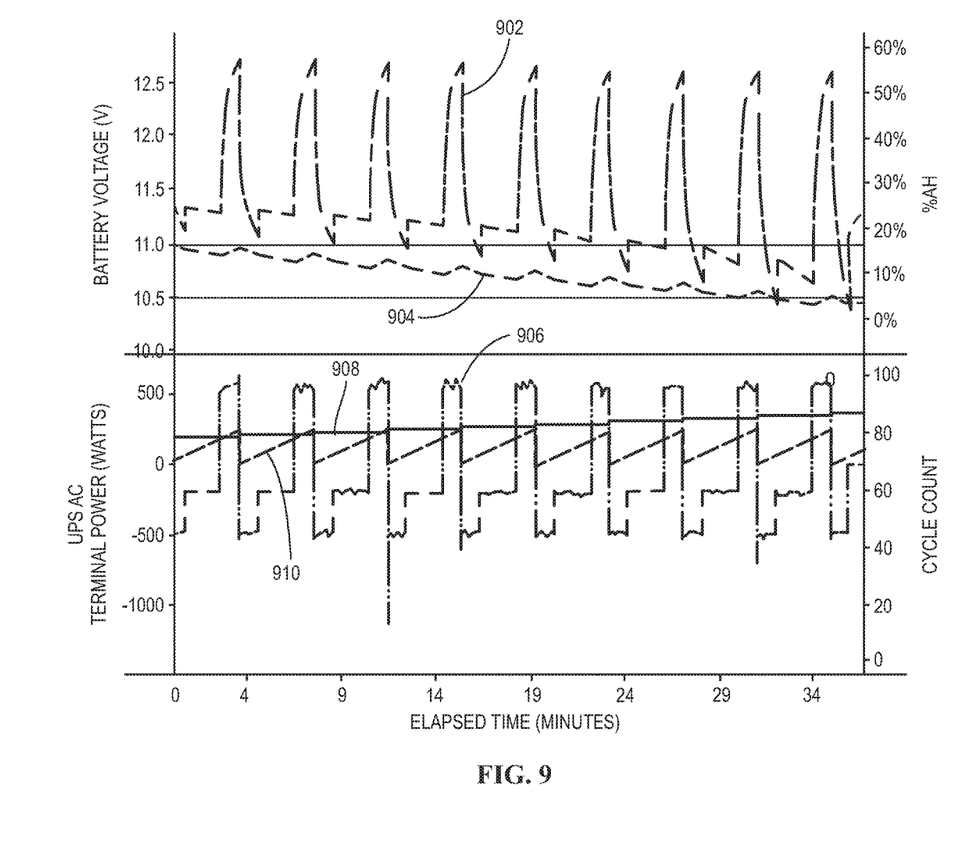
FIG. 9 is a graph showing the timeline during the test of FIG. 8 as the low battery voltage limit is approached.

FIG. 9 illustrates a timeline as the low battery voltage limit of FIG. 8 is approached. Based on this data, a low battery voltage limit is set, such as, but not limited to 11.0v for the illustrative embodiment shown. However, this limit can be adjustable through administration level access, such as, but not limited to, from 10.5v to 12.0v for the illustrative embodiment shown. For the illustrative embodiment shown, line 902 represents battery voltage, line 904 represents battery charge level, line 906 represents power, line 908 represents cycle count and line 910 represents elapsed time.

In general, if the battery voltage is below the defined threshold while the battery is supplying power to the apparatus, a fault is displayed indicating low battery voltage.

Once unit power is applied and the battery is charging, the fault can be manually cleared only if the battery voltage is above the threshold, as recited above. Alternatively, the fault may be cleared subject to a battery health test being successfully performed.

If battery faults or warnings occur, a battery health test can be performed to determine if the battery is functional or if the battery should be replaced. This test is a manual procedure initiated through the video graphic control panel to monitor battery voltage while under a known load to ensure that the battery has enough health left to withstand a power failure event. The test is available through the service access level.

A user initiates the battery health test by pressing a button on a screen of the video display of the control panel. In order to initiate this test, the apparatus must not be running and a safety stop switch must be open. The user is directed through the video display to disconnect main power to the apparatus, forcing the battery back-up to power the apparatus as it would during a power failure. The user must manually disconnect the power. Once the control panel detects that power is supplied by the battery, it commands the magnetic bearing compressor to levitate for a defined period, i.e. for the illustrative embodiment shown, 60 seconds. Throughout the test, the monitoring system monitors the battery voltage in the same manner as the monitoring system monitors the battery voltage during a power failure event to make sure it does not drop below the low battery voltage limit.

For this test, the power loss holdup time must be increased (to 10 minutes for the illustrative embodiment) to allow time for the test to take place.

If the voltage drops below the low limit the test fails and the battery should be replaced or inspected. If a shutdown occurs due to voltage, fuses, disconnect, or any other reason, the test fails and a fault is displayed on the next power up stating that the battery health test has failed. This fault can be cleared by running a successful battery health test.

Alternatively, if the voltage remains above the low limit during the test, the control panel displays a message stating the battery passed the test.

The control panel commands the magnetic bearing compressor to delevitate the shaft for the remainder of the test. Upon completion, the control panel instructs the user to manually reconnect main power to the apparatus. Once power is connected, the control panel can then display the message that the battery health test is complete.

If the main power is not reconnected within a set period of time (5 minutes for the illustrative embodiment), a warning is displayed indicating that the test failed and needs to be redone. If the power loss holdup timer runs out the control panel displays the same fault that is used for the shutdown, which can be cleared by running a successful battery test. If the battery voltage drops below the low battery voltage limit after delevitating and while waiting for the main power to be reconnected, a warning is displayed indicating that the test failed.

If the bearings drop the shaft while rotating during a power loss event, it is an indication that there is something wrong with the bearings, magnetic bearing compressor, control panel, or wiring. A method for counting these landings is provided. In the event that the landing count increments beyond acceptable amounts, a landing fault should be displayed and require a manual clear before the apparatus will start again. This fault should not be allowed to clear if battery voltage is below charging threshold and such issue is not remedied as described above.

In the event of reoccurring landing counts, a fault appears stating that there is a magnetic bearing compressor power panel system failure that requires administration level access to clear. The fault should not be allowed to clear if the battery voltage is below charging threshold and if other criteria have been encountered, such as but not limited to, when 3 landings are counted within the last 24 run hours, or 10 landings are counted within the last 3000 run hours.

This invention is beneficial when the UPS does not monitor or provide battery status to the control panel. The present invention provides a reliable and cost effective method of monitoring the status of the backup battery at known loads through determined limits which are specific to the apparatus, thereby communicating flag faults and warnings to the control panel. In so doing, the apparatus is inhibited or prevented from continued operation when there is insufficient backup power to protect the apparatus when a power failure occurs, thereby preventing excess wear to the touchdown bearings and shaft of the apparatus.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A method of monitoring a backup battery for a magnetic bearing centrifugal compressor, the method comprising:
    establishing a threshold voltage for a battery level of the backup battery;
    monitoring an actual voltage of the backup battery;
    comparing the actual voltage of the backup battery to the threshold voltage;
    initiating a shutdown sequence of the magnetic bearing centrifugal compressor if the magnetic bearing centrifugal compressor is operating and the actual voltage is below the threshold voltage for a defined period of time;
    preventing the magnetic bearing centrifugal compressor from starting if the magnetic bearing centrifugal compressor is not operating and the actual voltage is below the threshold voltage; and
    allowing the magnetic bearing centrifugal compressor to continue operation or begin operation if the actual voltage is greater than the threshold voltage.

2. The method as recited in claim 1, wherein if the actual voltage is below 12.7v for 5 seconds and the magnetic bearing centrifugal compressor is not running, a control panel will prevent the magnetic bearing centrifugal compressor from starting until the actual voltage reaches at least 12.8v.

3. The method as recited in claim 1, further comprising:
    displaying a warning indicating low actual voltage if the actual voltage is below the threshold voltage and the magnetic bearing centrifugal compressor is operating; and
    initiating the shutdown sequence of the magnetic bearing centrifugal compressor after the warning has been displayed for the defined period of time.

4. The method as recited in claim 3, wherein the defined period of time is 60 minutes.

5. The method as recited in claim 3, further comprising:
    removing the warning if the actual voltage rises above the threshold voltage during the defined period of time; and
    resetting the defined period of time.

6. The method as recited in claim 1, further comprising:
    field adjusting the threshold voltage to compensate for variables at a site having the magnetic bearing centrifugal compressor.

7. The method as recited in claim 6, further comprising:
    adjusting the threshold voltage based on an actual temperature of the backup battery or a control panel communicatively coupled to the backup battery.

8. The method as recited in claim 1, further comprising:
    monitoring an input voltage at an input to an uninterruptible power source of the magnetic bearing centrifugal compressor to determine if the backup battery is connected or disconnected to the magnetic bearing centrifugal compressor.

9. The method as recited in claim 8, wherein a charging voltage provided by the uninterruptible power source is different when the backup battery is disconnected in comparison to when the backup battery is connected and is charging, wherein when the backup battery is connected, the charging voltage is steady over time, and wherein when the backup battery is disconnected, the charging voltage varies with an amplitude above an amplitude threshold.

10. The method as recited in claim 9, wherein to determine whether the backup battery is connected or disconnected, amplitude readings over an additional defined period of time are monitored, and whereby if a difference between a minimum voltage and a maximum voltage of the amplitude readings is greater than a threshold variance, a respective sample of the amplitude readings is recorded and saved.

11. The method as recited in claim 10, wherein monitoring the amplitude readings over the additional defined period of time comprises collecting a plurality of amplitude samples, wherein if the threshold variance is exceeded for 4 consecutive samples of the plurality of amplitude samples, a fault is displayed indicating the backup battery is disconnected.

12. The method as recited in claim 11, wherein a voltage peak above an expected charging voltage range is present if the backup battery is disconnected, and wherein if the actual voltage exceeds a threshold level, a warning is displayed and is counted as a first sample toward the 4 consecutive samples that lead to the fault indicating the backup battery is disconnected.

13. The method as recited in claim 10, wherein the minimum voltage of the amplitude readings does not change with a temperature of the backup battery, the magnetic bearing centrifugal compressor, a site having the magnetic bearing centrifugal compressor, or a combination thereof.

14. The method as recited in claim 1, further comprising:
monitoring a number of times bearings drop a shaft of the magnetic bearing centrifugal compressor while the shaft is rotating during a power loss event;
counting the number of times bearings drop the shaft of the magnetic bearing centrifugal compressor;
comparing the counted number of times the bearings drop the shaft of the magnetic bearing centrifugal compressor to a defined threshold number of times the bearings drop the shaft of the magnetic bearing centrifugal compressor;
displaying a fault if the counted number of times the bearings drop the shaft of the magnetic bearing centrifugal compressor is greater than the defined threshold; and
preventing the magnetic bearing centrifugal compressor from starting until such fault is cleared.

15. A method of monitoring a backup battery for a magnetic bearing centrifugal compressor, the method comprising:
monitoring voltage amplitude over a period of time at an input to an uninterruptible power source of the magnetic bearing centrifugal compressor to determine if the backup battery is connected or disconnected to the magnetic bearing centrifugal compressor, whereby if a difference between a minimum voltage and a maximum voltage is greater than a threshold variance, an amplitude sample is recorded and saved;
collecting a plurality of amplitude samples comprising the amplitude sample;
displaying a fault if the threshold variance is exceeded for a defined amount of consecutive samples of the plurality of amplitude samples indicating the backup battery is disconnected;
initiating a shutdown sequence of the magnetic bearing centrifugal compressor if the magnetic bearing centrifugal compressor is operating and the threshold variance is exceeded for the defined amount of consecutive samples;
preventing the magnetic bearing centrifugal compressor from starting if the magnetic bearing centrifugal compressor is not operating and the threshold variance is exceeded for the defined amount of consecutive samples; and
allowing the magnetic bearing centrifugal compressor to continue operation or begin operation if the threshold variance is not exceeded for the defined amount of consecutive samples.

16. The method as recited in claim 15, wherein a charging voltage output from the uninterruptible power source is different when the backup battery is disconnected in comparison to when the backup battery is connected and is charging, such that when the backup battery is connected, the charging voltage is steady over time, and such that when the backup battery is disconnected, the charging voltage varies with an amplitude above an amplitude threshold.

17. The method as recited in claim 15, wherein if the threshold variance is exceeded for 4 consecutive samples of the plurality of amplitude samples, the fault is displayed indicating the backup battery is disconnected from the magnetic bearing centrifugal compressor.

18. The method as recited in claim 17, wherein a voltage peak above an expected charging voltage range is present if the backup battery is disconnected, and wherein if an actual voltage exceeds a threshold level, a warning is displayed and is counted as a first sample toward the 4 consecutive samples that lead to the fault indicating the backup battery is disconnected.

19. A method of monitoring a backup battery for a magnetic bearing centrifugal compressor, the method comprising:
monitoring a number of times bearings drop a shaft of the magnetic bearing centrifugal compressor while the shaft is rotating during a power loss event;
counting the number of times the bearings drop the shaft of the magnetic bearing centrifugal compressor;
comparing the counted number of times the bearings drop the shaft of the magnetic bearing centrifugal compressor to a defined threshold number of times the bearings drop the shaft of the magnetic bearing centrifugal compressor;
displaying a fault if the counted number of times the bearings drop the shaft of the magnetic bearing centrifugal compressor is greater than the defined threshold; and
preventing the magnetic bearing centrifugal compressor from starting until the fault is cleared.

* * * * *